(12) United States Patent
Vrehen et al.

(10) Patent No.: US 7,773,490 B2
(45) Date of Patent: Aug. 10, 2010

(54) OPTICAL COMPENSATOR FOR USE IN AN OPTICAL SCANNING DEVICE

(75) Inventors: Joris Jan Vrehen, Eindhoven (NL); Teunis Willem Tukker, Eindhoven (NL)

(73) Assignee: CP- Mahk Japan Co., Ltd., Yamagata (JP)

( * ) Notice: Subject to any disclaimer, the term of this patent is extended or adjusted under 35 U.S.C. 154(b) by 644 days.

(21) Appl. No.: 11/721,170

(22) PCT Filed: Dec. 2, 2005

(86) PCT No.: PCT/IB2005/054027
§ 371 (c)(1),
(2), (4) Date: Jun. 8, 2007

(87) PCT Pub. No.: WO2006/061755
PCT Pub. Date: Jun. 15, 2006

(65) Prior Publication Data
US 2009/0252017 A1 Oct. 8, 2009

(30) Foreign Application Priority Data
Dec. 10, 2004 (EP) .................................. 04106462

(51) Int. Cl.
*G11B 7/135* (2006.01)
(52) U.S. Cl. .............................. 369/112.05; 369/112.23
(58) Field of Classification Search ........................ None
See application file for complete search history.

(56) References Cited
U.S. PATENT DOCUMENTS
6,687,037 B2    2/2004   Hendriks et al.

FOREIGN PATENT DOCUMENTS

| WO | 02082437 | | 10/2002 |
|---|---|---|---|
| WO | 03060891 | A2 | 7/2003 |
| WO | 03060892 | A2 | 7/2003 |

OTHER PUBLICATIONS

B.H.W. Hendriks et al; "Application of Nonperiodic Phase Structures in Optical Systems", Applied Optics, Optical Society of America, Washington, DC, vol. 40, No. 35, pp. 6548-6560, Dec. 10, 2001.
G. Bouwhuis, J. Braat et al; "Principles of Optical Disc Systems" pp. 75-80, 1985.

*Primary Examiner*—Wayne R Young
*Assistant Examiner*—Brian Butcher
(74) *Attorney, Agent, or Firm*—McDermott Will & Emery LLP

(57) ABSTRACT

An optical compensator is included in an optical scanning device for scanning optical record carriers. There are at least two different information layer depths within two different carriers. The scanning device produces first to third radiation beams respectively having different wavelengths for scanning first to third record carriers, respectively. The optical compensator has a non-periodic phase structure through which each radiation beam is arranged to pass. The non-periodic phase structure includes stepped annular zones separated by steps. The zones form a non-periodic radial pattern. The stepped annular zones introduce first to third different wavefront modifications into at least part of the first to third radiation beams, respectively. Radial height variations are included in the stepped annular zones, and are arranged such that non-zero contributions are provided to each wavefront modification by the optical compensator in each stepped annular zone.

21 Claims, 11 Drawing Sheets

OPTICAL COMPENSATOR FOR USE IN AN OPTICAL SCANNING DEVICE

The present invention relates to an optical compensator for use in an optical scanning device for scanning optical record carriers having information layers, there being at least two different information layer depths within two different ones of the carriers.

The field of data storage using optical record carriers is currently an intensively researched area of technology. Many such optical record carrier formats exist including compact discs (CD), conventional digital versatile discs (DVD), Blu-ray discs (BD) and high definition digital versatile discs (HD-DVD). These formats are available in different types including read-only versions (e.g. CD-ROM/DVD-ROM/BD-ROM), recordable versions (e.g. CD-R/DVD-R/BD-R), re-writeable versions (e.g. CD-RW/DVD-RW/BD-RE) and audio versions (e.g. CD-A). For scanning the different formats of optical record carrier it is necessary to use a radiation beam having a different wavelength. This wavelength is approximately 785 nm for scanning a CD, approximately 660 nm for scanning a DVD (note that the officially specified wavelength is 650 nm, but in practice it is often close to 660 nm) and approximately 405 nm for scanning a BD.

Different formats of optical disc are capable of storing different maximum quantities of data. This maximum quantity is related to the wavelength of the radiation beam which is necessary to scan the disc and a numerical aperture (NA) of the objective lens. Scanning, when referred to herein, can include reading and/or writing of data on the disc.

The data on an optical disc is stored on an information layer. The information layer of the disc is protected by a cover layer which has a predetermined thickness. Different formats of optical disc have a different thickness of the cover layer, for example the cover layer thickness of CD is approximately 1.2 mm, DVD is approximately 0.6 mm and BD is approximately 0.1 mm. When scanning an optical disc of a certain format, the radiation beam is focused to a point on the information layer. As the radiation beam passes through the cover layer of the disc a spherical aberration is introduced into the radiation beam. An amount of introduced spherical aberration depends on the thickness of the cover layer and the wavelength of the radiation beam. Prior to reaching the cover layer of the disc the radiation beam needs to already possess a certain spherical aberration such that in combination with the spherical aberration introduced by the cover layer, the radiation beam may be correctly focused on the information layer of the disc. For scanning different discs with different cover layer thicknesses, the radiation beam needs to possess a different spherical aberration prior to reaching the cover layer. This ensures correct focusing of the radiation beam on the information layer.

As a result when using a single objective to scanning all discs, different amount of spherical aberration for each disc type must be generated by the objective in order to cope with the difference in cover layer thickness.

An article by B. H. W. Hendriks, J. E. de Vries, and H. P. Urbach entitled "Application of non-periodic phase structures in optical systems", Applied Optics vol. 40, pp 6548-6560 (2001) describes a nonperiodic phase structure (NPS) which is capable of rendering a DVD objective lens compatible with CD scanning.

International patent application WO 03/060891 describes an optical scanning device for scanning an information layer of three different optical record carriers using, respectively, three different radiation beams. Each radiation beam has a polarization and a different wavelength. The device includes an objective lens having a diffractive part which includes birefringent material. The diffractive part diffracts the radiation beams such that the beam with the shortest wavelength has an introduced phase change modulo $2\pi$ of substantially zero for the shortest wavelength. The diffractive part diffracts at least one of the other radiation beams into a positive first order.

International patent application WO 03/060892 describes an optical scanning device for scanning an information layer of three different optical record carriers using, respectively, three different radiation beams. Each radiation beam has a polarization and a different wavelength. The device includes an objective lens and a non-periodic phase structure (NPS) for compensating a wavefront aberration of one or two of the radiation beams. The phase structure includes birefringent material and has a non-periodic stepped profile.

U.S. Pat. No. 6,687,037 describes an optical scanning device for scanning optical record carriers with radiation beams of two different wavelengths. The device includes an objective lens and a diffractive element having a stepped profile which approximates a blazed diffraction grating. The diffractive element selects a zeroth diffraction order for the radiation beam of the shortest wavelength, and selects a first order for the other radiation beam.

For two mode objective lenses like a DVD/CD compatible lens NPSs or diffractive structures can be used with a lens designed for one mode to correct the spherical aberration in the other mode. In case of the three-mode objective lens the demands for such an NPS or diffractive structure are very severe since the structure has to compensate different amount of spherical aberration in two modes, while leaving the third mode unaffected. Furthermore, where the three modes include wavelengths of 785 nm radiation and 405 nm radiation, the ratio between the wavelengths is such that in most optical materials the introduced phase change due to an NPS step differs by approximately a factor of 2, which results either in a poor transmission for one of the wavelengths or relatively high NPS steps, which make for expensive manufacturing processes.

Another drawback of currently proposed solutions is that they rely on gratings of which for each wavelength a different diffraction order is used. This imposes a relation between the aberrations that need correction. For example a BD objective system can be made compatible with DVD and CD by using respectively the zeroth, first and second order diffraction of a grating. This would be a perfect solution if the optical phase difference (OPD) of the phase steps for CD has exactly the same shape, but is twice as high as the OPD for DVD. Since this is not exactly true for this system, another small correction must be added to solve this problem. For a HDDVD triple mode objective this is even more difficult, since the difference in OPD between HDDVD and DVD which can be generated using an NPS step is very small compared to the difference in OPD between DVD and CD or HDDHD and CD which can be generated using an NPS step.

In accordance with one aspect of the present invention, there is provided an optical compensator for use in an optical scanning device for scanning optical record carriers having information layers, there being at least two different information layer depths within two different ones of the carriers, the optical record carriers including a first optical record carrier, a second optical record carrier and a third optical record carrier, the scanning device including a radiation source system for producing first, second and third radiation beams for scanning said first, second and third record carriers, respectively, said first, second and third radiation beams having different predetermined wavelengths, the optical compensator having a non-periodic phase structure through which each of said first, second and third radiation beams are arranged to pass, said non-periodic phase structure including a plurality of stepped annular zones separated by steps, the zones forming a non-periodic radial pattern, the stepped annular zones introducing first, second and third different wavefront modifications into at least part of the first, second and third radiation beams, respectively, characterized in that said optical compensator includes radial height variations corresponding to at least some of said plurality of stepped annular zones, said radial height variations being arranged such that non-zero contributions are provided to each of said first, second and third wavefront modifications by said optical compensator in parts of the wavefront corresponding to said at least some of said plurality of stepped annular zones.

In accordance with a further aspect of the invention, there is provided an optical scanning device comprising an optical compensator arranged in accordance with the invention.

The present invention provides three, or more, mode compatible objective systems using NPS structures which add phases, modulo $2\pi$, which are not equal to zero for any of the modes. By allowing phase steps to become visible for all modes, the remaining aberrations, namely the root mean square (RMS) average OPD across the wavefront after the radiation beam has passed through the objective system and the cover layer, i.e. at the focused spot, for each mode can be reduced and therefore the transmission and spot shape can be improved, overall. Since this solution does not rely on a grating using different orders for each mode, there is no relation imposed between the different aberrations to be corrected.

In preferred embodiments of the invention, an aspheric surface is provided by one or more of the radial height variations. This can be used to provide an optical compensation effect which is optimized across all modes.

The invention provides a solution for a Blu-Ray™ triple mode objective system, combining Blu-Ray, DVD and CD.

The invention also provides a solution for a HDDVD triple mode objective system, combining HDDVD, DVD and CD.

Further features and advantages of the invention will become apparent from the following description of preferred embodiments of the invention, given by way of example only, which is made with reference to the accompanying drawings.

Figure 3A:
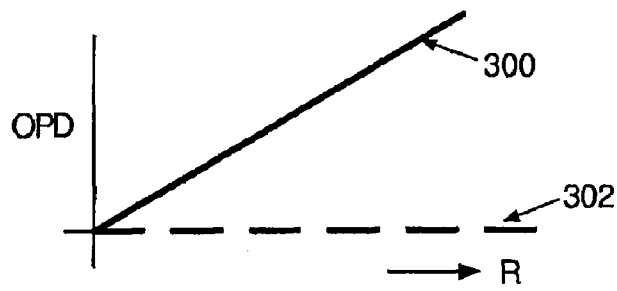
Figure 3B:
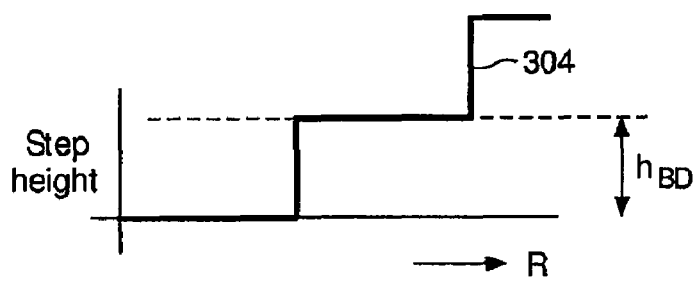
Figure 3C:
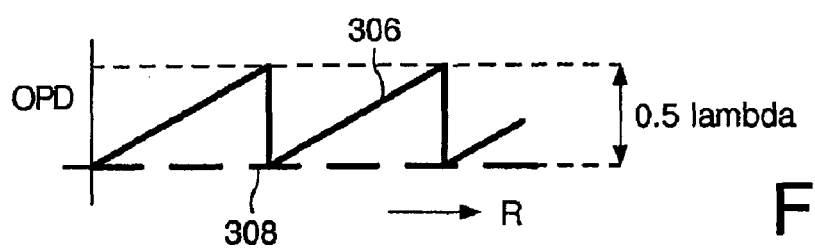

FIGS. 3a, 3b and 3c schematically illustrate a radial profile of an OPD to be corrected, an NPS structure, and a remaining OPD in accordance with the prior art.

Figure 4A:
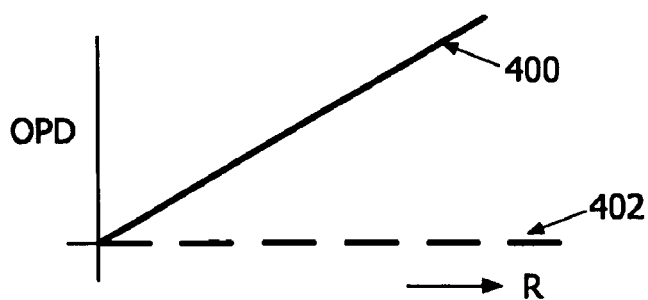
Figure 4B:
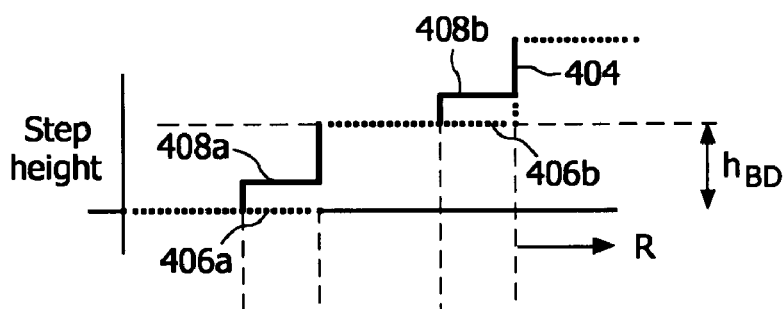
Figure 4C:
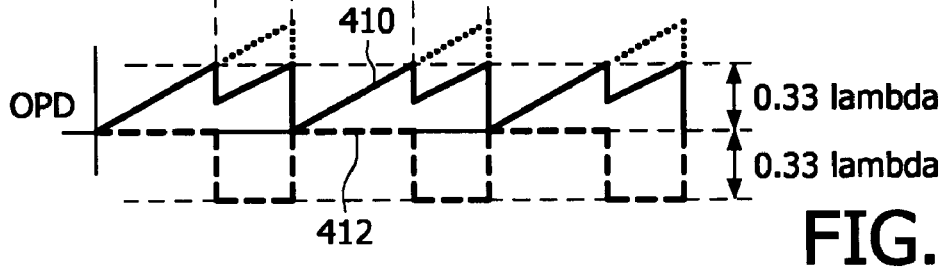

FIGS. 4a, 4b and 4c schematically illustrate a radial profile of an OPD to be corrected, an NPS structure, and a remaining OPD in accordance with a first embodiment of the invention.

Figure 5A:
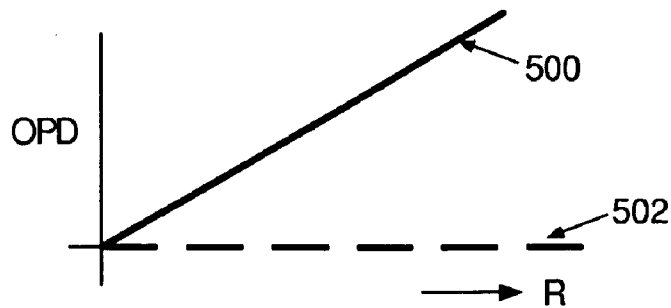
Figure 5B:
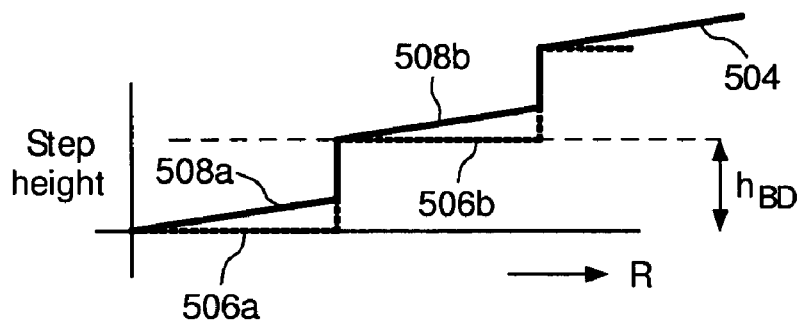
Figure 5C:
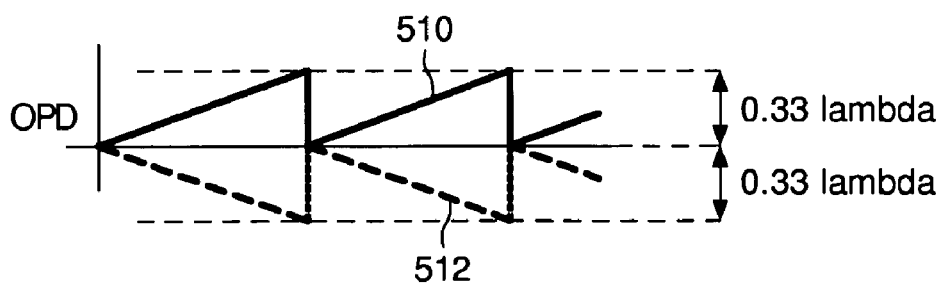

FIGS. 5a, 5b and 5c schematically illustrate a radial profile of an OPD to be corrected, an NPS structure, and a remaining OPD in accordance with a second embodiment of the invention.

Figure 6:
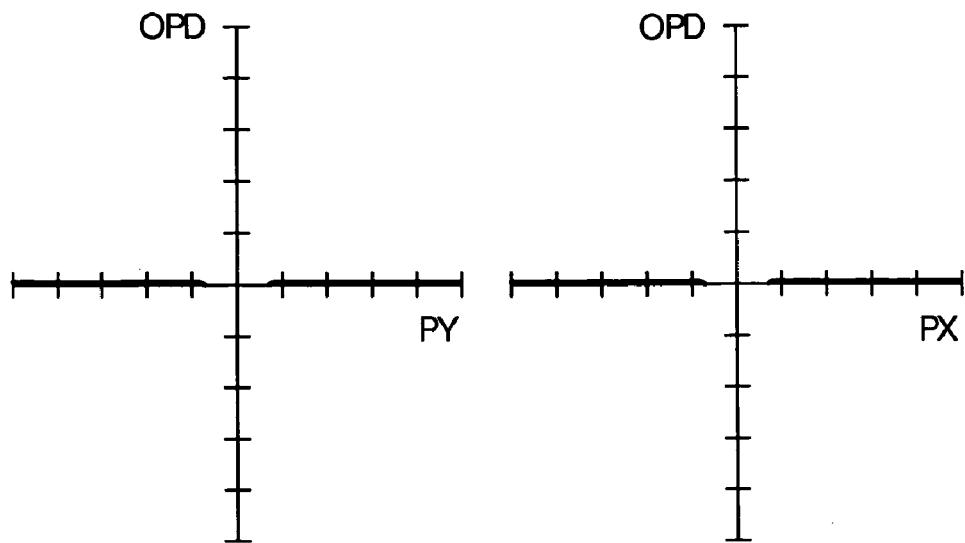
Figure 7:
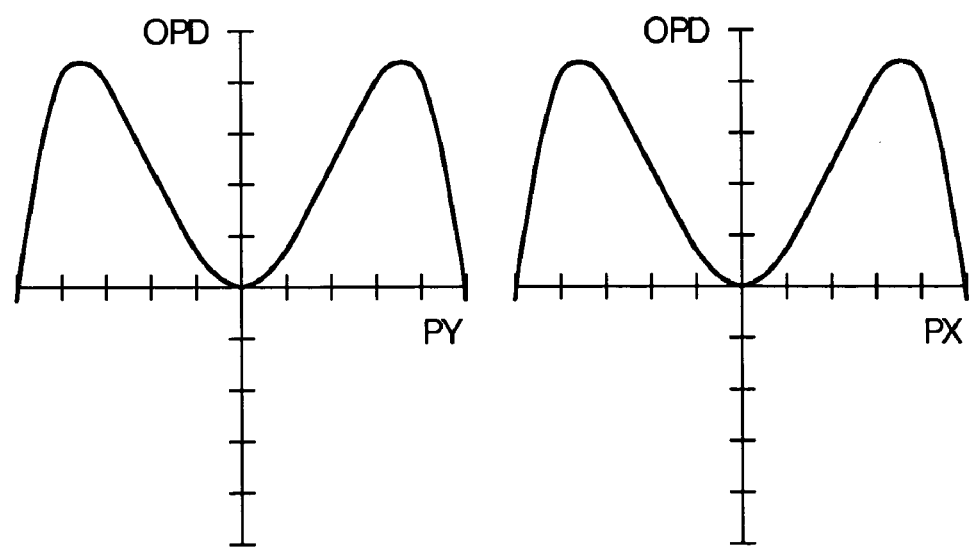
Figure 8:
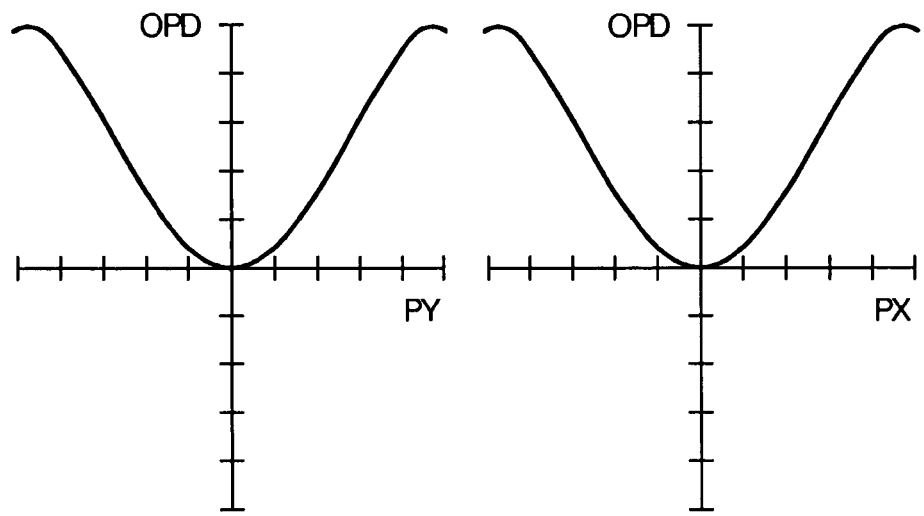

FIGS. 6, 7 and 8 each show a wavefront aberration to be corrected for three different radiation beams by an optical compensator in accordance with a third embodiment of the present invention.

Figure 9:
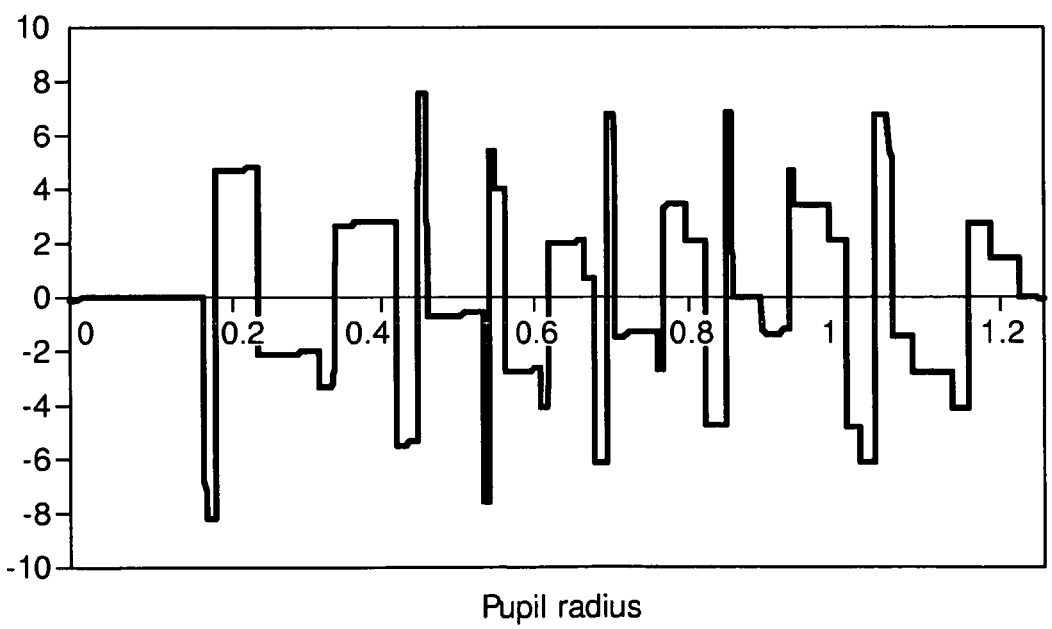

FIG. 9 shows a radial surface profile of an NPS in accordance with the third embodiment of the present invention.

Figure 10:
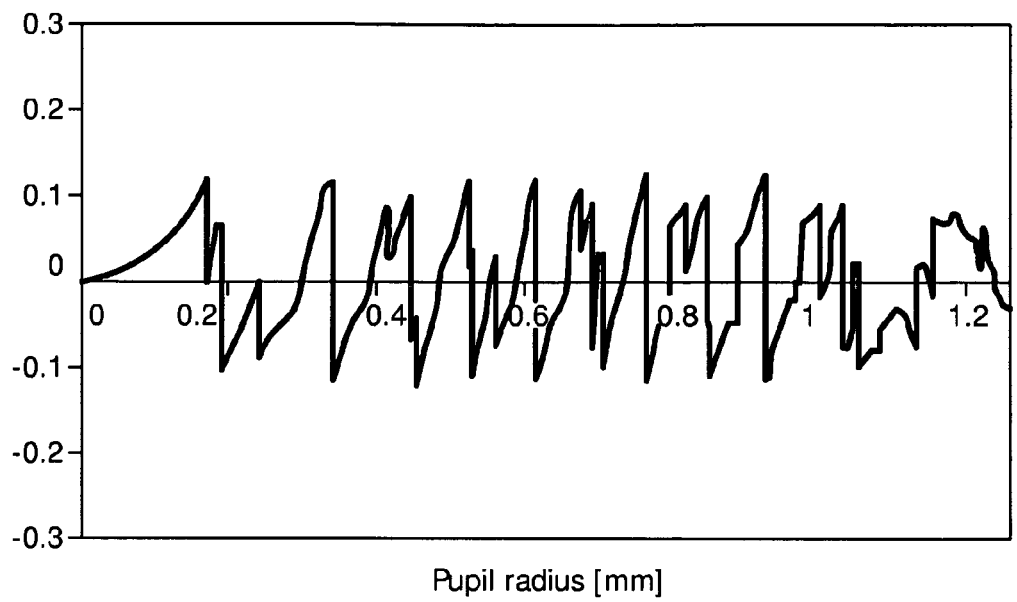
Figure 11:
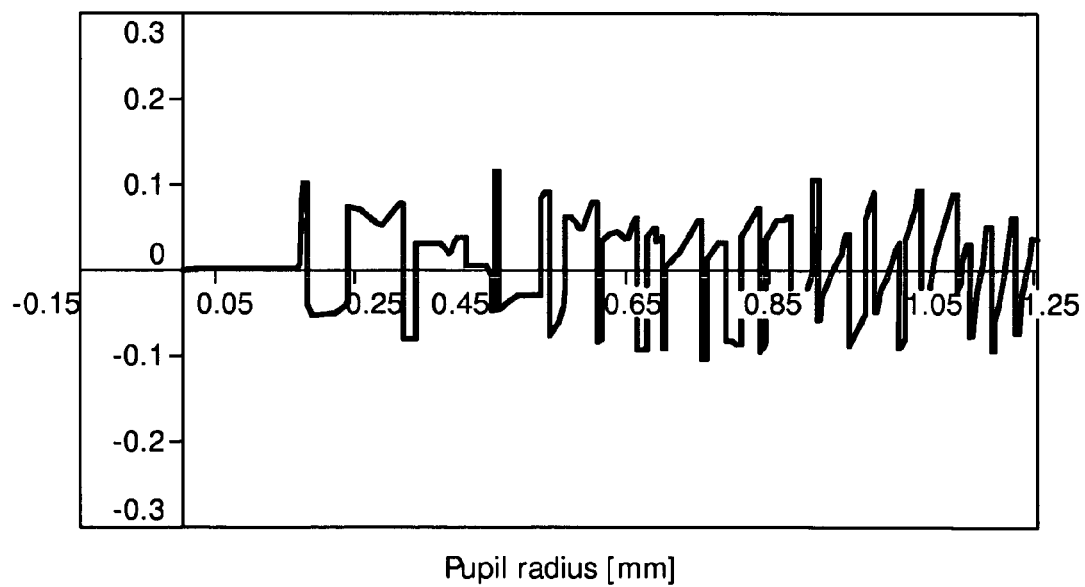
Figure 12:
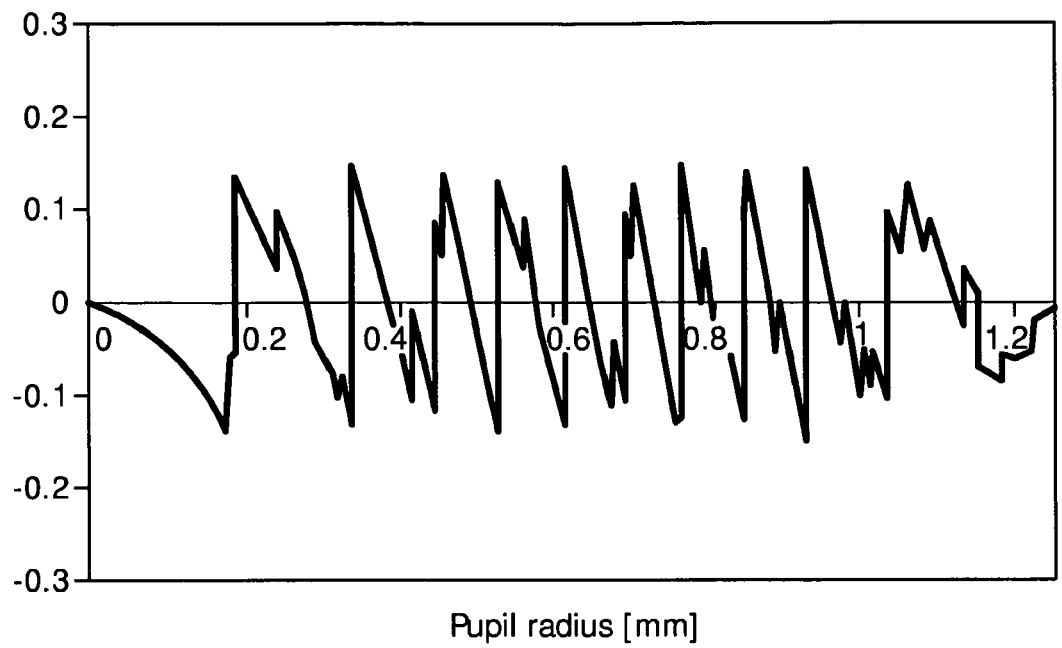

FIGS. 10, 11 and 12 each show a radial profile of a remaining OPD in three different radiation beams after compensation by an optical compensator in accordance with the third embodiment of the present invention.

Figure 13:
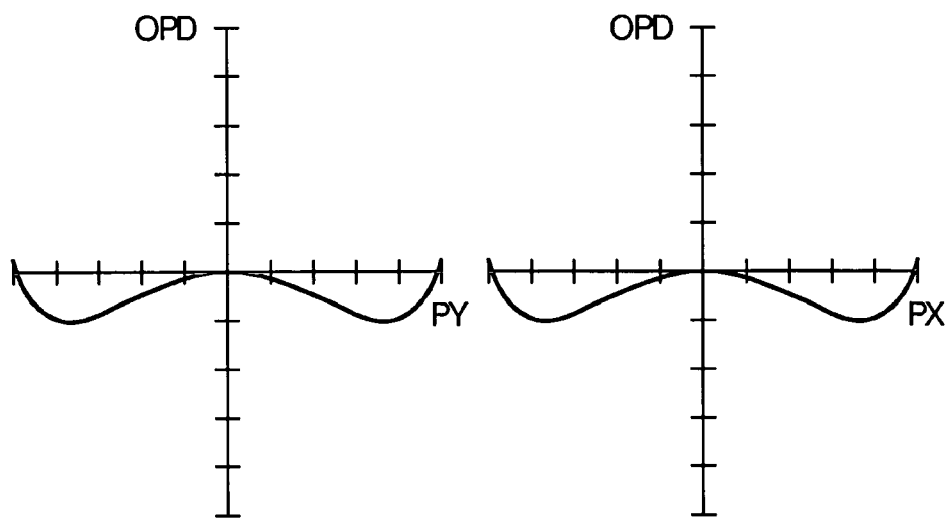
Figure 14:
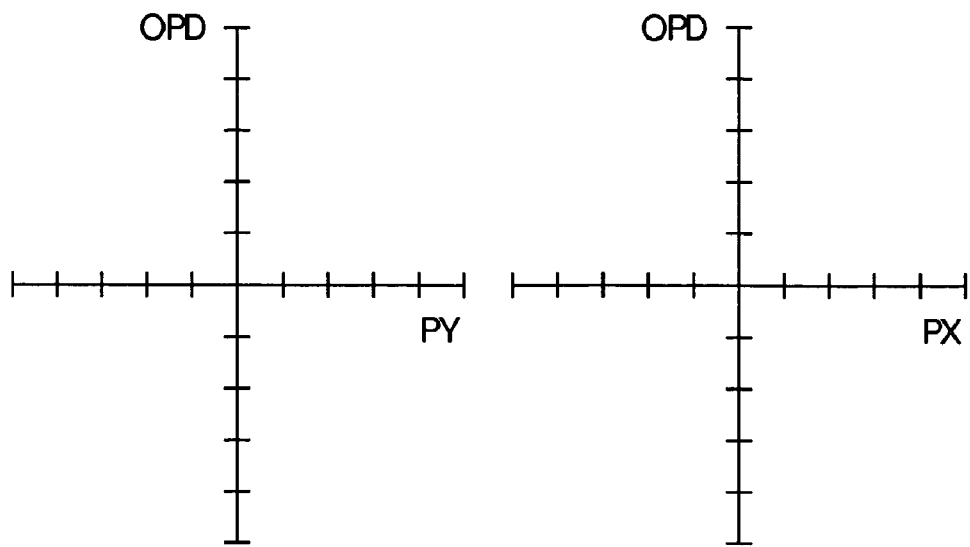
Figure 15:
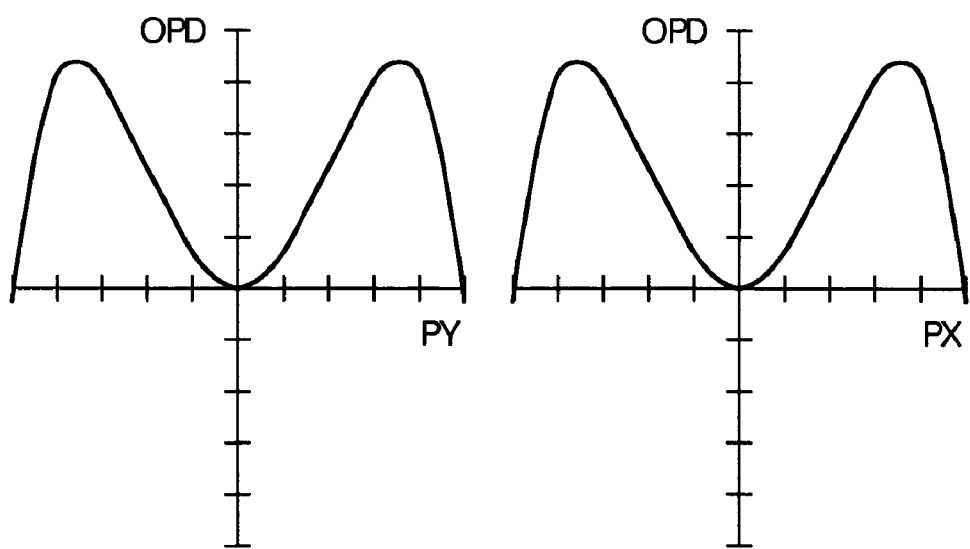

FIGS. 13, 14 and 15 each show a wavefront aberration to be corrected for three different radiation beams by an optical compensator in accordance with a fourth embodiment of the present invention.

Figure 16:
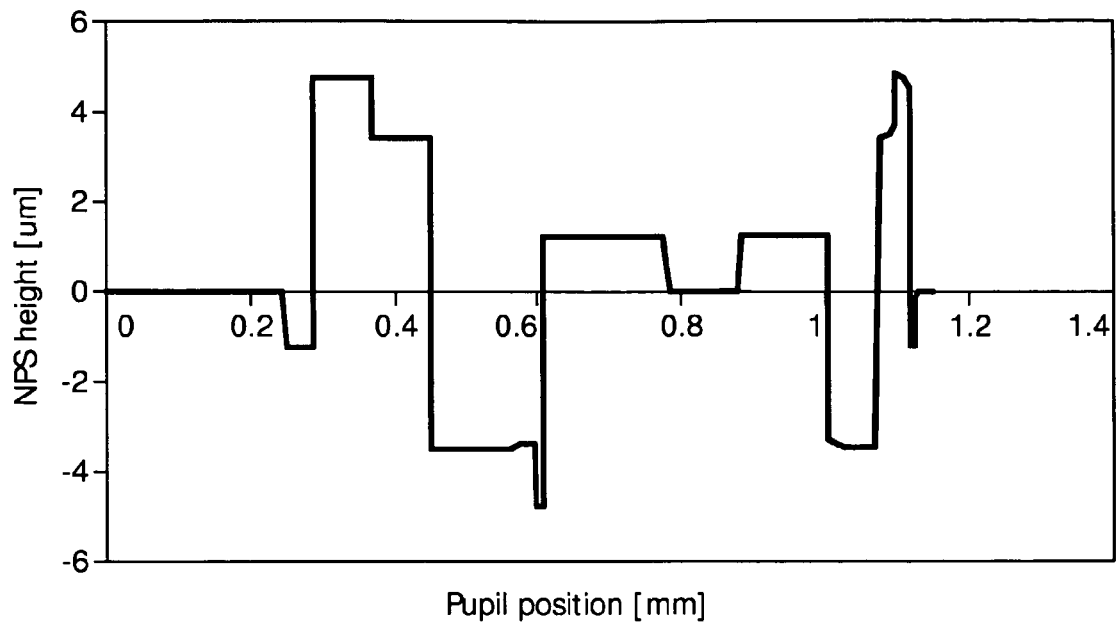

FIG. 16 shows a radial surface profile of an NPS in accordance with the fourth embodiment of the present invention.

Figure 17:
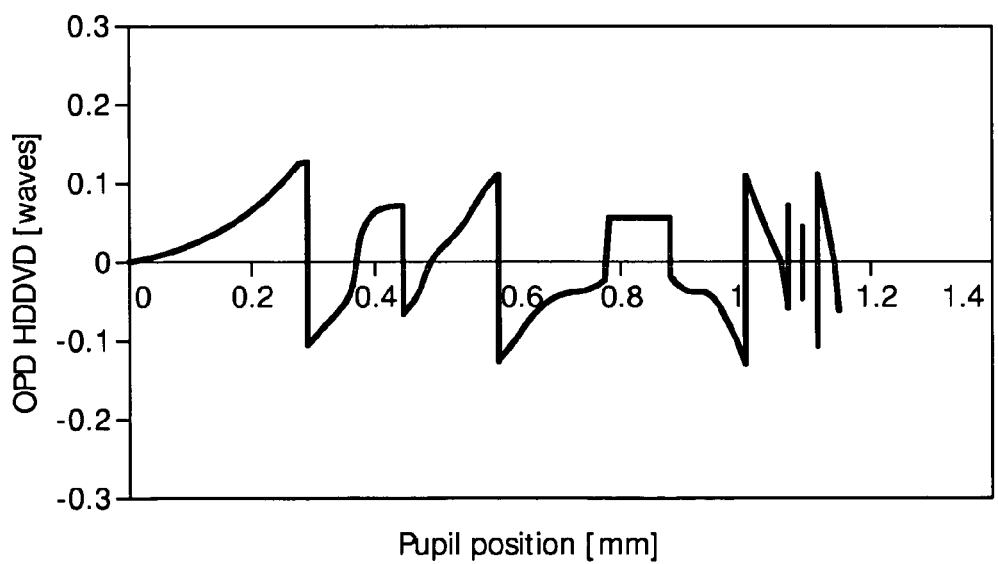
Figure 18:
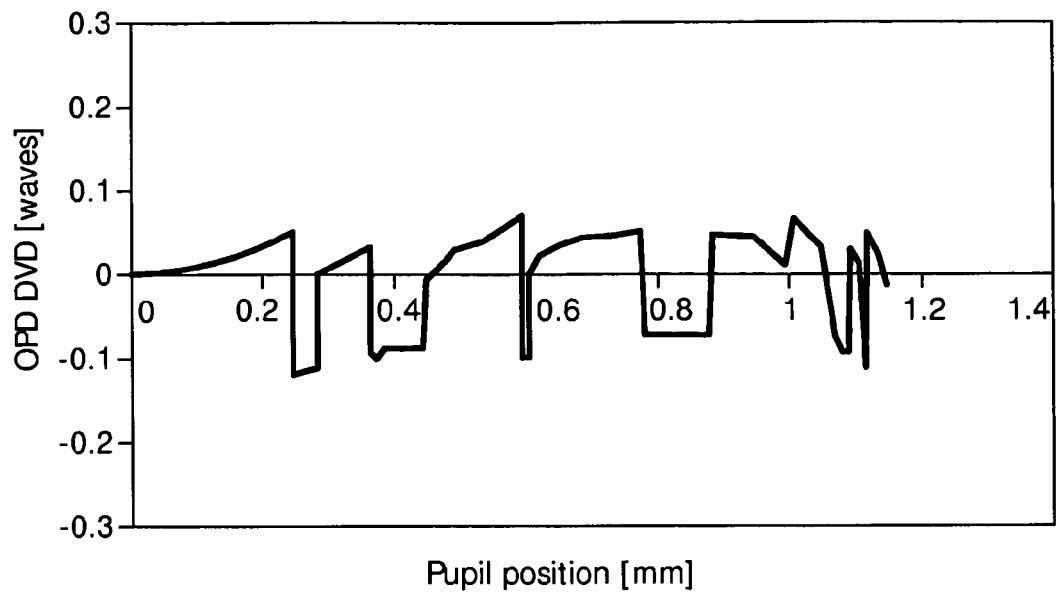
Figure 19:
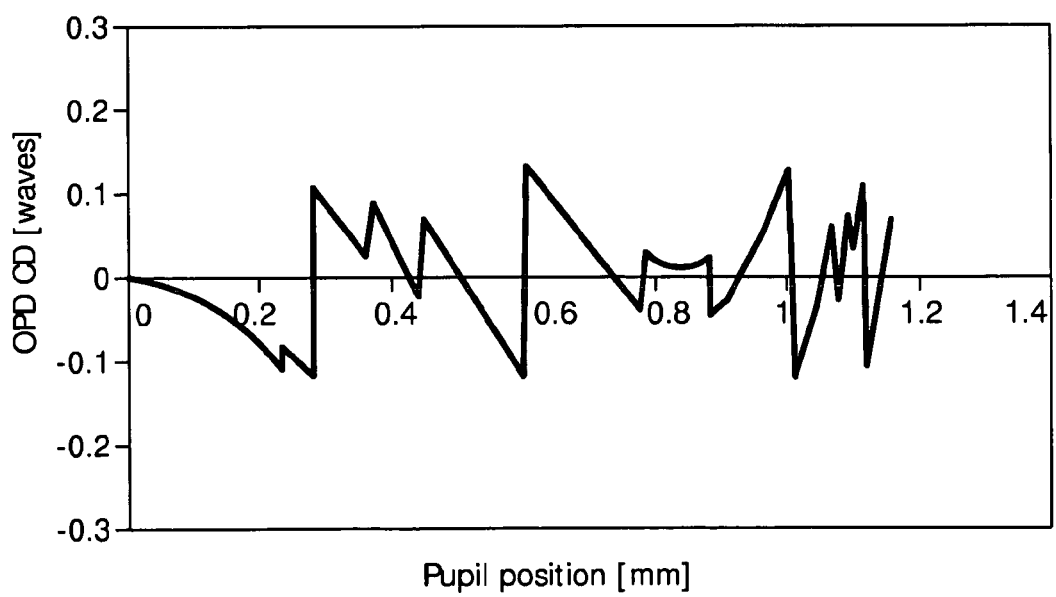

FIGS. 17, 18 and 19 each show a radial profile of a remaining OPD in three different radiation beams after compensation by an optical compensator in accordance with the fourth embodiment of the present invention.

Figure 1:
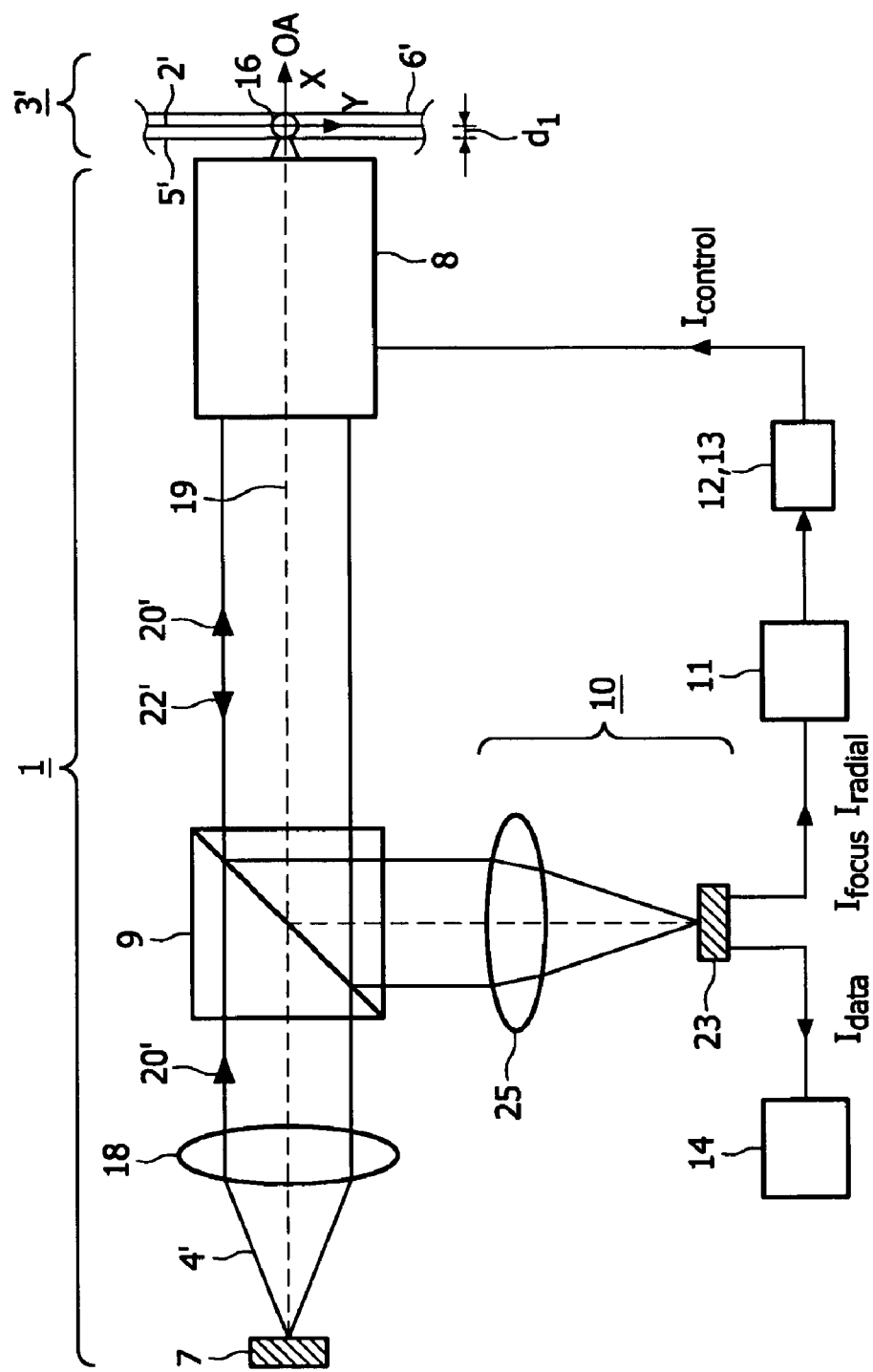
FIG. 1 shows schematically an optical scanning device in accordance with an embodiment of the present invention.

FIG. 1 shows schematically an optical scanning device for scanning first, second and third optical record carriers with a first, second and third, different, radiation beam, respectively. The first optical record carrier 3' is illustrated and has a first information layer 2' which is scanned by means of the first radiation beam 4'. The first optical record carrier 3' includes a cover layer 5' on one side of which the first information layer 2' is arranged. The side of the information layer facing away from the cover layer 5' is protected from environmental influences by a protective layer 6'. The cover layer 5' acts as a substrate for the first optical record carrier 3' by providing mechanical support for the first information layer 2'. Alternatively, the cover layer 5' may have the sole function of protecting the first information layer 2', while the mechanical support is provided by a layer on the other side of the first information layer 2', for instance by the protective layer 6' or by an additional information layer and cover layer connected to the uppermost information layer. The first information layer 2' has a first information layer depth $d_1$ that corresponds to the thickness of the cover layer 5'. The second and third optical record carriers (not shown) have a second and a third, different, information layer depth $d_2$, $d_3$, respectively, corresponding to the thickness of the cover layer (not shown) of the second and third optical record carriers, respectively. The third information layer depth $d_3$ is less than the second information layer depth $d_2$ which is less than the first information layer depth $d_1$, i.e. $d3<d2<d1$. The first information layer 2' is a surface of the first optical record carrier 3'. Similarly the second and third information layers (not shown) are surfaces of the second and third optical record carriers. That surface contains at least one track, i.e. a path to be followed by the spot of a focused radiation on which path optically readable marks are arranged to represent information. The marks may be, e.g., in the form of pits or areas with a reflection coefficient or a direction of magnetization different from the surroundings. In the case where the first optical record carrier 3' has the shape of a disc, the following is defined with respect to a given track: the "radial direction" is the direction of a reference axis, the X-axis, between the track and the center of the disc and the "tangential direction" is the direction of another axis, the Y-axis, that is tangential to the track and perpendicular to the X-axis. In this embodiment the first optical record carrier 3' is a compact disc (CD) and the first information layer depth $d_1$ is approximately 1.2 mm, the second optical record carrier is a conventional digital versatile disc (DVD) and the second information layer depth $d_2$ is approximately 0.6 mm, and the third optical record carrier is a Blu-ray™ disc (BD) and the third information layer depth $d_3$ is approximately 0.1 mm.

As shown in FIG. 1, the optical scanning device 1 has an optical axis OA and includes a radiation source system 7, a collimator lens 18, a beam splitter 9, an objective system 8 and a detection system 10. Furthermore, the optical scanning device 1 includes a servo circuit 11, a focus actuator 12, a radial actuator 13, and an information-processing unit 14 for error correction.

The radiation source system 7 is arranged for consecutively or simultaneously producing the first radiation beam 4', the second radiation beam and/or the third, different, radiation beam (not shown in FIG. 1). For example, the radiation source 7 may comprise either a tuneable semiconductor laser for consecutively supplying the radiation beams or three semiconductor lasers for simultaneously or consecutively supplying these radiation beams. The first radiation beam 4' has a first predetermined wavelength $\lambda_1$, the second radiation beam 4" has a second, different, predetermined wavelength $\lambda_2$, and the third radiation beam 4''' has a third different predetermined wavelength $\lambda_3$. In this embodiment the third wavelength $\lambda_3$ is shorter than the second wavelength $\lambda_2$. The second wavelength $\lambda_2$ is shorter than the first wavelength $\lambda_1$. In this embodiment the first, second and third wavelength $\lambda_1$, $\lambda_2$, $\lambda_3$, respectively, is within the range of approximately 770 to 810 nm for $\lambda_1$, 640 to 680 nm for $\lambda_2$, 400 to 420 nm for $\lambda_3$ and preferably approximately 785 nm, 660 nm and 405 nm, respectively. The first, second and third radiation beams have a numerical aperture (NA) of approximately 0.5, 0.65 and 0.85 respectively.

The collimator lens 18 is arranged on the optical axis OA for transforming the first radiation beam 4' into a first substantially collimated beam 20'. Similarly, it transforms the second and third radiation beams into a second substantially collimated beam 20" and a third substantially collimated beam 20''' (illustrated in FIG. 2).

The beam splitter 9 is arranged for transmitting the first, second and third collimated radiation beams toward the objective system 8. Preferably, the beam splitter 9 is formed with a plane parallel plate that is tilted with an angle $\alpha$ with respect to the optical axis OA and, preferably, $\alpha=45°$.

The objective system 8 is arranged to focus the first, second and third collimated radiation beams to a desired focal point on the first, second and third optical record carriers, respectively. The desired focal point for the first radiation beam is a first scanning spot 16'. The desired focal point for the second and third radiation beams are second and third scanning spots 16", 16''', respectively (shown in FIG. 2). Each scanning spot corresponds to a position on the information layer of the appropriate optical record carrier. Each scanning spot is preferably substantially diffraction limited and has a wave front aberration which is less than 70 m$\lambda$.

During scanning, the first optical record carrier 3' rotates on a spindle (not shown) and the first information layer 2' is then scanned through the cover layer 5'. The focused first radiation beam 20' reflects on the first information layer 2', thereby forming a reflected first radiation beam which returns on the optical path of the forward converging focused first radiation beam provided by the objective system 8. The objective system 8 transforms the reflected first radiation beam to a reflected collimated first radiation beam 22'. The beam splitter 9 separates the forward first radiation beam 20' from the reflected first radiation beam 22' by transmitting at least a part of the reflected first radiation beam 22' towards the detection system 10.

The detection system 10 includes a convergent lens 25 and a quadrant detector 23 which are arranged for capturing said part of the reflected first radiation beam 22' and converting it to one or more electrical signals. One of the signals is an information signal $I_{data}$, the value of which represents the information scanned on the information layer 2'. The information signal $I_{data}$ is processed by the information-processing unit 14 for error correction. Other signals from the detection system 10 are a focus error signal $I_{focus}$ and a radial tracking error signal $I_{radial}$. The signal $I_{focus}$ represents the axial difference in height along the optical axis OA between the first scanning spot 16' and the position of the first information layer 2'. Preferably, this signal is formed by the "astigmatic method" which is known from, inter alia, the book by G. Bouwhuis, J. Braat, A. Huijser et al, entitled "Principles of Optical Disc Systems," pp. 75-80 (Adam Hilger 1985) (ISBN 0-85274-785-3). A device for creating an astigmatism according to this focusing method is not illustrated. The radial tracking error signal $I_{radial}$ represents the distance in the XY-plane of the first information layer 2' between the first scanning spot 16' and the center of a track in the information layer 2' to be followed by the first scanning spot 16'. Preferably, this signal is formed from the "radial push-pull method" which is known from, inter alia, the book by G. Bouwhuis, pp. 70-73.

The servo circuit 11 is arranged for, in response to the signals $I_{focus}$ and $I_{radial}$, providing servo control signals $I_{control}$ for controlling the focus actuator 12 and the radial actuator 13, respectively. The focus actuator 12 controls the position of a lens of the objective system 8 along the optical axis OA, thereby controlling the position of the first scanning spot 16' such that it coincides substantially with the plane of the first information layer 2'. The radial actuator 13 controls the position of the lens of the objective system 8 along the X-axis, thereby controlling the radial position of the first scanning spot 16' such that it coincides substantially with the center line of the track to be followed in the first information layer 2'.

Figure 2:
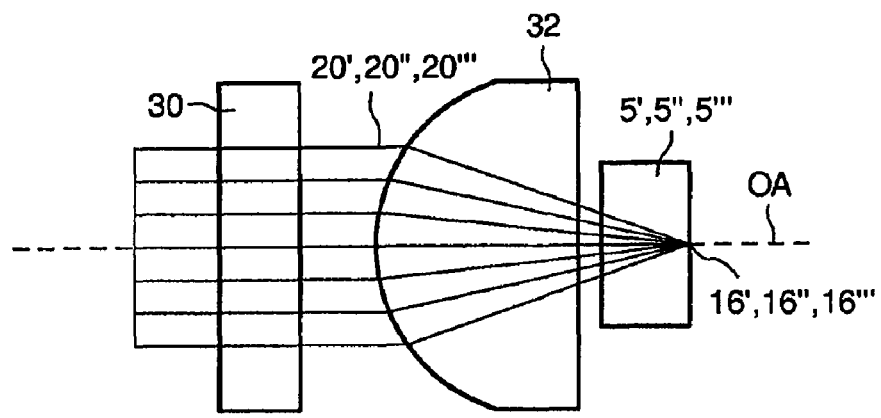
FIG. 2 shows schematically an optical system of the optical scanning device in accordance with an embodiment of the present invention.

FIG. 2 shows schematically the objective system 8 of the optical scanning device. The objective system 8, in accordance with an embodiment of the present invention, is arranged to introduce first, second and third, different, wavefront modifications $WM_1$, $WM_2$, $WM_3$, into at least part of the first, second and third radiation beams 20', 20", 20''', respectively. Each of the wavefront modifications $WM_1$, $WM_2$, $WM_3$, includes a non-periodic phase component, which will be described in further detail below.

The objective system 8 includes an optical compensator, which in this embodiment is in the form of a corrector plate 30, and an objective lens 32 which are both arranged on the optical axis OA. The objective lens 32 has an aspherical face facing in a direction away from the optical record carrier. The lens 32 is, in this example, formed of glass.

The corrector plate 30 includes a planar base substrate on which an NPS is formed. The NPS includes a series of annular zones of different heights, each separated by a discrete step of a controlled height.

Conventionally, the zones of an NPS introduce a constant phase across the zone and are selected such that, at the position of the step, the zone is substantially invisible to the wavelength of a selected one of the first, second and third radiation beams 20', 20", 20'''. That is to say, steps can be found which add a phase, modulo 2$\pi$, which is equal to zero for one of the wavelengths. The zone widths, and step heights, are chosen to provide a desired compensation of aberrations for the two other wavelengths.

In a conventional NPS, the zone heights $h_j$ (the height of zone j above the base surface of the substrate) are designed to be equal to:

$$h_j = m_j \frac{\lambda}{n-1} \qquad (1)$$

where $m_j$ is an integer, $\lambda$ the wavelength and $n_1$ is the refractive index of the material from which the NPS is made, at that wavelength. The above equation is valid where the NPS inter-faces with air; the interface could also be between two different materials, in which case the denominator becomes $(n_1-n_2)$.

Thus, the zone heights differ by integral multiples (1, 2, 3, etc.) of a basic step height. Embodiments of the invention may make use of the basic step heights $h_{BD}$, $h_{DVD}$, $h_{CD}$ and $h_{HDDVD}$. These are basic step heights selected according to equation (1) above, wherein $m_j=1$ and the appropriate wavelength $\lambda$, namely approximately 405 nm, 660 nm, 785 nm, and 405 nm respectively, is used.

One of the problems mentioned above is that the wavelength of the CD radiation and the BD radiation is such that in most common optical materials the introduced phase change due to an NPS step differs by approximately a factor of 2. As has been pointed out in the article "Application of non-periodic phase structures in optical systems" referenced above, the number of substantially different phase steps available for use in an NPS can be calculated using a continued fraction. The number of substantially different phase steps for this situation is 2. This means that by using an integer number of $2\pi$ phase steps for the 405 nm radiation, only phase steps of approximately 0 and $\pi$ at 785 nm can be made.

FIG. 3a illustrates a radial profile 300 of the OPD of the wavefront to be corrected for the CD case and a radial profile 302 of the OPD of the wavefront to be corrected for the BD case. In this case the objective lens is optimized for BD, so there is no OPD to be corrected, and the wavefront profile to be corrected for CD is linear.

In FIG. 3b an example is shown of a conventional NPS structure, not in accordance with the present invention, as a radial cross section showing the profile of each of a plurality of annular NPS zones separated by discontinuous steps. In FIG. 3b the NPS zones are separated by steps with heights which are multiples of the basic step height $h_{BD}$.

In FIG. 3c shows a radial profile 306 of the resulting remaining OPD for CD and a radial profile 308 of the resulting remaining OPD for BD, after compensation using the NPS structure shown in FIG. 3b. The remaining OPD for BD is still perfect, but the CD remaining OPD shows a peak-to-peak value of 0.5 waves. Whilst an improvement is seen for CD, such a high remaining peak-to-peak value of the remaining OPD will cause very high transmission losses towards the spot on disc.

In embodiments of the invention, NPS structures are provided which are similar, at a first order of magnitude (which corresponds the order of magnitude of the size to the basic steps heights) to conventional NPS structures, in that each zone of an NPS structure according to embodiments of the invention includes a basic radial zone profile, which can be taken to be flat, i.e. introduce a constant phase across its width, as in the conventional NPS structures. However, according to embodiments of the invention, an additional radial surface profile is superimposed on the basic zone profile within each zone, or at least some zones, of the NPS to add variable phase. This additional radial surf-ace profile of a zone provides a height variation within the zone, across its radial width. The additional radial surface profile is non-diffractive. Each height variation within a zone is significantly smaller than the height variations between the zones, which can be taken as the height variation between the average height of the zone and the average height of its adjacent zones. Each height variation within a zone is typically at most a half of the height variation between the average height of the zone and the average height of its adjacent zones. Note, in case the NPS structure is formed on a curved lens surface (according to an alternative embodiment, to be mentioned below), height variations within a zone discussed here are above and beyond the basic height variations provided by the base profile of the lens. The additional radial surface profile has the effect of further reducing the remaining aberrations, typically spherical aberration, for at least one, more preferably two, of the wavelengths, whilst introducing acceptable aberrations for the one wavelength for which the lens design is optimized. Alternatively, the lens design may not be optimal for any of the wavelengths.

The additional radial surface profile may be the same in each zone. However, the additional radial surface profile preferably is different in different zones, since the aberrations to be corrected typically are different in different zones. Preferably, an additional radial surface profile is used in each respective zone which is different in each respective zone. As a result, the peak-to-peak remaining OPDs for each wavelength are preferably less than 0.5 wave, more preferably less than 0.4 wave and even more preferably less than 0.333 wave. Moreover, the maximum remaining OPDs for at least two of the wavelengths are preferably less than 0.333 wave, more preferably less than 0.2 wave. However, there is remaining high order aberration for each wavelength. Therefore, the peak-to-peak remaining OPD for each wavelength is typically at least 0.05 wave, and may be at least 0.1 wave or even at least 0.2 wave.

FIG. 4a corresponds with FIG. 3a, namely showing a radial profile of an OPD to be corrected. FIG. 4b shows an NPS structure, as a radial profile showing the surface profile 404 of each of a plurality of annular NPS zones separated by discontinuous steps, in accordance with a first embodiment of the invention. FIG. 4b shows the NPS zones having heights which are multiples of the basic step height $h_{BD}$ and sub-zones of additional sub-step height $\frac{1}{3} h_{BD}$. Here the surface within each NPS zone in includes a sub-zone in order to further reduce the remaining aberrations for at least one, more preferably two, of the wavelengths, whilst introducing acceptable aberrations for the one wavelength for which the lens design is optimized. The basic zone profiles 406a, 406b for each zone are shown as a dotted line. The additional radial surface profiles 408a, 408b in each zone are shown as a full line. The radial height variations provided by the additional radial surface profiles in this case comprise a discrete sub-step with a sub-zone of a constant height. The size of the discrete sub-step is 0.33 of the height of the steps used in the basic zone profiles. In this embodiment, the structure provides a reduction in aberrations for the CD wavelength by allowing phase steps that also introduce phase for the BD case, but which are limited to acceptable aberrations. Within each phase step an NPS sub-zone is placed which is formed by a discrete sub-step which subtracts approximately 165 m$\lambda$ of phase from the CD OPD at the expense of approximately (2*165=) 330 m$\lambda$ remaining OPD in the BD case.

FIG. 4c shows the radial profile 410 of the remaining OPD for CD and the radial profile 412 of the remaining OPD for BD, after compensation using the NPS structure shown in FIG. 4b. Here a peak-to-peak value of the remaining OPD is reduced to within 330 m$\lambda$ for CD, and a peak-to-peak value of the remaining OPD of within 330 m$\lambda$ which is introduced for BD.

FIG. 5a corresponds with FIG. 3a, namely showing a radial profile of an OPD to be corrected. FIG. 5b shows an NPS structure, as a radial profile showing the surface profile 504 of each of a plurality of annular NPS zones separated by discontinuous steps, in accordance with a second embodiment of the invention. Here the surface within each NPS zone is made aspherical in order to further reduce the remaining aberrations for at least one, more preferably two, of the wavelengths, whilst introducing acceptable aberrations for the one wavelength for which the lens design is optimized. The basic zone profiles 506a, 506b for each zone are shown as a dotted line. The additional radial surface profiles 508a, 508b in each zone are shown as a full line. The radial height variations provided by the additional radial surface profiles in this case comprise a gradually varying height variation, beginning at zero at the innermost part of the zone and ending at the largest amount of height variation at the outermost part of the zone. The size of the largest height variation is 0.33 of the height of the steps used in the basic zone profiles. For this simplified case, where the OPD to be corrected is linear with pupil position, the aspherical surface will also be linear, however it should be appreciated that, more generally, an aspherical surface may comprise a continuous surface with a varying curvature.

FIG. 5c shows the radial profile 510 of the remaining OPD for CD and the radial profile 512 of the remaining OPD for BD, after compensation using the NPS structure shown in FIG. 5b. In this case the losses due to the remaining OPD peak-to-peak variations are well balanced between the two modes.

The remaining OPD shown above for this BD/CD system is in fact a worst-case situation, since a continuous fraction (CF) of 2 is assumed. If the CF is higher the peak-to-peak remaining OPD will be further reduced. Adding a phase step of a height which is a multiple of the basic step height $h_{CD}$ to the phase structure, as described above, will not influence the remaining OPD since $2\pi$ phase for the CD wavelength equals a phase step of approximately $4\pi$ for BD. With this feature an NPS made of steps which are multiples of the basic step height $h_{CD}$, which introduces different phase steps for the DVD wavelength. The CF for the CD DVD system is in general much higher. In the article referenced above, "Application of non-periodic phase structures in optical systems", an example is given using $2\pi$ phase steps at the DVD wavelength yielding (since $h_{DVD}/h_{CD}=0.8356$) a number of substantially different phase steps of six. In this case however the phase steps will be made of $2\pi$ phase steps at the CD wavelength thus yielding (since $h_{CD}/h_{DVD}=1.1967$) a number of substantially different phase steps of five, which is sufficient to also correct the DVD remaining OPD.

In a third embodiment of the invention, a design is presented for the three wavelength part of a BD/DVD/CD compatible objective. In Table 1 below the parameters used for the different modes are listed for this embodiment.

TABLE 1

|  | Substrate [mm] | NA | λ nm |
| --- | --- | --- | --- |
| BD | 0.0875 | 0.85 | 405 |
| DVD | 0.6 | 0.65 | 660 |
| CD | 1.2 | 0.5 | 785 |

For this lens a lens body is used which is optimized for BD made from Sumita K-VC89 glass. In front of this lens a corrector plate is placed, as illustrated in FIG. 2, onto which the NPS structure for the compatibility with DVD and CD is placed. The compatible lens is to be used at infinite conjugate for all modes. The NPS is in this embodiment made of a photopolymer (2P) replica material formed by a moulding process on a planar base profile provided by a flat glass substrate plate, having planar sides.

In FIGS. 6, 7 and 8 the remaining OPDs without NPS correction are plotted for the different modes of operation for the three wavelength part of the pupil. In FIG. 6, the remaining OPD is plotted for the BD mode within the three wavelength part of the pupil. In FIG. 7, the remaining OPD is plotted for the DVD mode within the three wavelength part of the pupil. In FIG. 8, the remaining OPD is plotted for the CD mode within the three wavelength part of the pupil. The scale of the OPD plots is the same (1 wave) in the first 2 plots (BD and DVD) and 5 waves in last plots. It is clear to see that the lens is designed as a BD-optimized lens. In the DVD case some 0.93 waves peak of spherical aberration needs to be corrected and in the CD case approximately 5 waves peak of aberration must be corrected. In order to increase the working distance for CD some defocus has been added in this mode.

In order to correct the remaining OPDs for the DVD and the CD mode a series of NPS zones are designed which are also aspherical within each zone, which compensate at least some of the remaining OPD for DVD and CD but also adds a small amount of aberration to the BD mode. In this case (optimized lens for BD) the step heights are within ranges:

$$h = m*h_{BD} + \frac{\Delta*\lambda_{BD}}{n_{BD}-1}, \text{ where } -0.4 < \Delta < 0.4 \quad (2)$$

In FIG. 9 the NPS structure is drawn for a corrector plate according to this embodiment. In FIG. 9 the NPS structure is shown as a radial cross section showing the profile of each of a plurality of annular NPS zones separated by discontinuous steps, in accordance with this embodiment of the invention, which is formed on the this corrector plate. The surface within each step is aspherical, which although not directly discernable in FIG. 9, as can be understood from viewing FIGS. 10, 11 and 12 respectively. Here the surface within each NPS zone is made aspherical in order to further reduce the remaining aberrations for at least one, more preferably two, of the wavelengths, whilst introducing acceptable aberrations for the one wavelength for which the lens design is optimized.

In this embodiment, the additional radial surface profile used in each zone is generated using a merit function. The best local zone height is determined for each radial position separately. To achieve this, the local zone height is varied and for each local zone height the merit function is determined. The local zone height with the lowest merit has the highest quality and is chosen as best local zone height for that radius. A high quality for one wavelength (CD, DVD or BD) is when the remaining OPD is closest to zero, however the merit function takes into account the quality for each wavelength, and balances the qualities to provide the highest overall quality as measured by the merit function. The remaining OPD is calculated by subtracting the OPD due to the zone height from the OPD that must be corrected and taking a fractional part of this value, so that all remaining OPDs lie between −0.5 wave and +0.5 wave.

An example of a merit function which may be used is the following:

$$\text{Merit}=(W_{BD}*ROPD_{BD}^4)+(W_{DVD}*ROPD_{DVD}^4)+(W_{CD}*ROPD_{CD}^4) \quad (3)$$

In equation (3), $ROPD_{BD}$, $ROPD_{DVD}$ and $ROPD_{CD}$ are the remaining OPDs for the different modes of operation. They are raised to a given even and positive power, in this example the $4^{th}$ power, in order to ensure that a high remaining OPD at one wavelength is much worse than low remaining OPD at the other wavelength in terms of light loss in the structure. With the weighting factors $W_{xx}$ the contribution of each mode can be weighted.

The merit function selects an optimum solution so that the peak-to-peak remaining OPDs for each wavelength, or at least two of the wavelengths, are preferably less than 0.5 wave, more preferably less than 0.4 and even more preferably less than 0.333 wave.

In FIGS. 10, 11 and 12 the remaining OPD within the three wavelength zone of the pupil for respectively the BD mode, the DVD mode and the CD mode are drawn.

The OPD for BD has been deteriorated and is now within a peak-to-peak range of 0.240 waves. In the DVD case the peak-to-peak remaining OPD is 0.219 waves, and in the CD case the remaining OPD is 0.301 waves peak-to-peak. In each case, the remaining aberrations are higher order aberrations. In general, high order aberrations as shown in FIGS. 10, 11 and 12 lead to loss in the transmission towards the focused spot, whereas low order aberrations tend to deteriorate the spot shape, and are thus more undesirable.

In a fourth embodiment of the invention, a design is provided for the three wavelength part of a HDDVD/DVD/CD compatible objective. It should be understood that the above description, relating to FIGS. 1 and 2, should be understood to apply here, with all references to BD replaced by references to HDDVD. In this embodiment the first optical record carrier 3' is a compact disc (CD) and the first information layer depth $d_1$ is approximately 1.2 mm, the second optical record carrier 3" is a conventional digital versatile disc (DVD) and the second information layer depth $d_2$ is approximately 0.6 mm, and the third optical record carrier 3''' is a high definition digital versatile disc (HDDVD) and the third information layer depth $d_3$ is approximately 0.6 mm.

In the Table 2 below the parameters used for the different modes are listed for this embodiment.

TABLE 2

|  | Cover Layer Thickness [mm] | NA | λ nm |
|---|---|---|---|
| HDDVD | 0.6 | 0.65 | 405 |
| DVD | 0.6 | 0.65 | 660 |
| CD | 1.2 | 0.5 | 785 |

For this lens a lens body is used optimized for DVD made from Sumita K-VC89 glass. In front of this lens a corrector plate is placed, as illustrated in FIG. 2, onto which the NPS structure for the compatibility with HDDVD and CD is placed. The compatible lens is to be used at infinite conjugate for all modes. The NPS is in this embodiment made of a photopolymer (2P) replica material formed by a moulding process on a planar glass substrate.

In FIGS. 13, 14 and 15 the remaining OPDs without NPS correction are plotted for the different modes of operation for the three wavelength part of the pupil. In FIG. 13, the remaining OPD is plotted for the HDDVD mode within the three wavelength part of the pupil. In FIG. 14, the remaining OPD is plotted for the DVD mode within the three wavelength part of the pupil. In FIG. 15, the remaining OPD is plotted for the CD mode within the three wavelength part of the pupil. The scale is the same in all plots (1 wave). It is clear to see that the lens is designed as a DVD lens. In the HDVD case the spherochromatism of the objective lens and the disc substrate causes some 0.2 waves peak of spherical aberration. In the CD approximately 1 wave peak of spherical aberration must be corrected.

In order to correct the remaining OPDs for the HDDVD and the CD mode a series of NPS steps are designed which are also aspherical within each step, which correct the remaining OPD for HDDVD and CD but also adds a small amount of aberration to the DVD mode. In this case (optimized lens for DVD) the step heights are within ranges:

$$h = m * h_{DVD} + \frac{\Delta * \lambda_{DVD}}{n_{DVD} - 1}, \text{ where } -0.4 < \Delta < 0.4 \quad (4)$$

In FIG. 16 the NPS structure is shown as a radial cross section showing the profile of each of a plurality of annular NPS zones separated by discontinuous steps, in accordance with this embodiment of the invention, which is formed on the corrector plate. The surface within each step is aspherical, which although not directly discernable in FIG. 16, can be understood from viewing FIGS. 17, 18 and 19. Here the surface within each NPS zone is made aspherical which has the effect of further reducing the remaining aberrations for at least one, more preferably two, of the wavelengths, whilst introducing acceptable aberrations for the one wavelength for which the lens design is optimized.

In this embodiment, the additional radial surface profile used in each zone is generated using the merit function (3) described above, with references to BD replaced by references to HDDVD. The merit function selects an optimum solution so that the peak-to-peak remaining OPDs for each wavelength, or at least two of the wavelengths, are preferably less than 0.5 wave, more preferably less than 0.4 and even more preferably less than 0.333 wave.

In FIGS. 17, 18 and 19 the remaining OPD within the three wavelength zone of the pupil for respectively the HDDVD mode, the DVD mode and the CD mode are drawn.

The remaining OPD for HDDVD is now within a peak-to-peak range of 0.26 waves, and the remaining aberration have been shifted to higher order aberration. In the DVD case the remaining OPD has been deteriorated in order to optimize the total performance. The peak-to-peak remaining OPD for this case is 0.184 waves with mainly high order aberrations. The remaining OPD for CD case is now within a peak-to-peak range of 0.245 waves, and the remaining aberrations are higher order aberrations.

Note, in relation to the above embodiments shown in FIGS. 9 and 16, that the manufacturability of the NPS may be improved by removing the steps in all zones of less than a predetermined width, and to have the radial profile of the surface follow the trajectory of one of the adjacent zones in the zone in which the step is being removed. For example, all zones of less than 5 μm may be removed in this way.

Embodiments of the invention provide objective systems for optical scanning devices whereby the central part of the radiation beam path is corrected for three wavelengths, compatible with formats of disc which require scanning using all NAs, including the highest NA (typically that with the lowest wavelength of radiation) using NPS structures. In the above, the discussion is limited to the central part of the lens, referred to as the three wavelength part. However, it should be understood that the embodiments described include structures and/or lens faces which render the respective parts of the objective compatible with formats of disc which require scanning using the outer part of the objective lens.

For the area immediately outside this central part of the lens the problem reduces to either a two wavelength only problem (as in the HDDVD/DVD/CD compatible objective embodiment described above), solved by use of only a two wavelength part outside the central three wavelength part, or a two wavelength problem followed by a one wavelength problem (as in the BD/DVD/CD compatible objective embodiment described above), solved by use of a two wavelength part outside the three wavelength part and a one wavelength part outside the two wavelength part. Commonly known solutions exist for both a two wavelength part and a one wavelength part. For the two wavelength part the corrector plate can be designed to include an NPS in the two wavelength part such as that described in the article "Application of non-periodic phase structures in optical systems" referred to above, the relevant contents of which are incorporated herein by reference, so as to provide appropriate compensation for the two relevant wavelengths. For the one wavelength part the objective lens itself, or the corrector plate, can be designed to be compensated using a continuous aspherical lens surface in the one wavelength part for the remaining wavelength.

The above embodiments are to be understood as illustrative examples of the invention. Further embodiments of the invention are envisaged.

In the above embodiments, an optical compensator is provided in the form of an NPS structure on a corrector plate which is separate from the objective lens. It should be noted that the NPS structure could also be placed directly on the lens body. In this case, the base surface of the substrate follows a lens surface shape, generally an aspherical surface shape, and the NPS structure is formed as a height variation with reference to the lens surface shape as the base profile. A lens with such an NPS may for example be made of a photopolymer (2P) replica material formed by a moulding process on a spherical surface of a glass substrate. The replica material may provide both the surface variation from the spherical glass surface to form the aspherical lens base profile and the NPS structure formed on top of the base profile.

Furthermore, an optical compensator according to the invention may be provided in the form of two separate elements, for example two different NPS structures on two separate corrector plates spaced along the optical axis of the optical system, or two NPS structures provided on opposite sides of a single corrector plate, the two NPS structures in either case having a combined effect which is similar to the single NPS structures described above.

Note also, that, whilst in the above embodiments, the additional redial profile is provided in each zone of the NPS. However, the additional radial surface profile may be used only in certain zones of the NPS, selected according to the respective amounts of optimization required in each zone. In some zones, no optimization may be desired, or even necessary. However, it is preferred that the additional radial surface profile is provided in at least two zones of the NPS.

Further, while the above embodiments describe compensation provided only in the form of an NPS structure, the optical compensator may also include one or more diffractive structures providing focusing and/or aberration compensating functions.

Embodiments described above relate to a BD, CD and DVD compatible objective system and a HDDVD, CD and DVD compatible objective system; however the invention can be applied to other multi-wavelength systems. Further, the invention is not limited to a three wavelength system but can also be applied to systems using more wavelengths.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An optical compensator for use in an optical scanning device for scanning optical record carriers, there being at least two different information layer depths within two different ones of the carriers, the optical record carriers including a first optical record carrier, a second optical record carrier and a third optical record carrier, the scanning device including a radiation source system for producing first, second and third radiation beams for scanning said first, second and third record carriers, respectively, said first, second and third radiation beams having different predetermined wavelengths, the optical compensator having a non-periodic phase structure through which each of said first, second and third radiation beams is arranged to pass, said non-periodic phase structure including a plurality of stepped annular zones separated by steps, the zones forming a non-periodic radial pattern, the stepped annular zones introducing first, second and third different wavefront modifications into at least part of the first, second and third radiation beams, respectively, wherein said optical compensator includes radial height variations corresponding to at least some of said plurality of stepped annular zones, said radial height variations being arranged such that non-zero contributions are provided to each of said first, second and third wavefront modifications by said optical compensator in parts of the wavefront corresponding to said at least some of said plurality of stepped annular zones.

2. An optical compensator according to claim 1, wherein said zones of said non-periodic phase structure include a basic radial zone profile which provides a substantially constant phase change in each of said first, second and third radiation beams, and wherein said compensator includes an additional radial surface profile corresponding to each of at least some of said zones, said additional radial surface profile of a zone providing said height variation within the zone.

3. An optical compensator according to claim 2, wherein said additional radial surface profile is superimposed on the basic zone profile within a zone.

4. An optical compensator according to claim 1, wherein each height variation within a zone is significantly smaller than a height variation between an average height of the zone and an average height of zones adjacent to said zone.

5. An optical compensator according to claim 4, wherein each height variation within a zone is at most a half of the height variation between the average height of the zone and the average height of zones adjacent to said zone.

6. An optical compensator according to claim 1, wherein the optical compensator is for use with an objective lens optimized for one of said first, second and third radiation beams, wherein said non-periodic phase structure is adapted to reduce remaining aberrations for at least one of said first, second and third radiation beams, and wherein said radial height variations have the effect of further reducing the remaining aberrations for at least said one of said first, second and third radiation beams whilst introducing acceptable aberrations for the radiation beam for which the lens design is optimized.

7. An optical compensator according to claim 1, wherein said radial height variations are different in different zones.

8. An optical compensator according to claim 1, wherein peak-to-peak remaining optical path differences in each of said first, second and third radiation beams, are, as a result of said radial height variations, less than 0.5 of a wavelength of each respective radiation beam.

9. An optical compensator according to claim 8, wherein the peak-to-peak remaining optical path differences in each of said first, second and third radiation beams, are, as a result of said radial height variations, less than 0.4 of a wavelength of each respective radiation beam.

10. An optical compensator according to claim 1, wherein peak-to-peak remaining optical path differences in each of said first, second and third radiation beams, are, as a result of said radial height variations, at least 0.05 of a wavelength of each respective radiation beam.

11. An optical compensator according to claim 1, wherein peak-to-peak remaining optical path differences in each of said first, second and third radiation beams, are, as a result of said radial height variations, at least 0.1 of a wavelength of each respective radiation beam.

12. An optical compensator according to claim 1, wherein at least one of said radial height variations provides a surface within the respective zone which is substantially aspherical.

13. An optical compensator according to claim 1, wherein the wavelength ($\lambda_3$) of said third radiation beam is shorter than the wavelength ($\lambda_2$) of said second radiation beam and the wavelength of said second radiation beam is shorter than the wavelength ($\lambda_1$) of said first radiation beam.

14. An optical compensator according to claim 13, wherein said predetermined wavelengths of said first, second and third radiation beams are approximately 785, 660 and 405 nanometers, respectively.

15. An optical compensator according to claim 1, wherein said first, second and third record carriers each have information layer depths which are substantially different.

16. An optical compensator according to claim 15, wherein said first, second and third record carriers have information layer depths which are approximately 1.2, 0.6 and 0.1 millimeters, respectively.

17. An optical compensator according to claim 1, wherein said first, second and third record carriers have respective information layer depths of which two are substantially the same.

18. An optical compensator according to claim 17, wherein said first, second and third record carriers have information layer depths which are approximately 1.2, 0.6 and 0.6 millimeters, respectively.

19. An optical compensator according to claim 1, wherein said optical compensator is provided in the form of an optical corrector plate to be provided separate from an objective lens for said optical scanning device.

20. An optical compensator according to claim 1, wherein said optical compensator is provided on the surface of an objective lens for said optical scanning device.

21. An optical scanning device comprising an optical compensator according to claim 1, the optical scanning device being for scanning optical record carriers, there being at least two different information layer depths within two different ones of the carriers, the optical record carriers including a first optical record carrier, a second optical record carrier and a third optical record carrier, the scanning device including a radiation source system for producing first, second and third radiation beams for scanning said first, second and third record carriers, respectively, said first, second and third radiation beams having different predetermined wavelengths.

* * * * *